United States Patent [19]

Clarke et al.

[11] Patent Number: 4,810,453
[45] Date of Patent: Mar. 7, 1989

[54] METHOD FOR APPLYING A PROTECTIVE COATING

[75] Inventors: Neil Clarke, Warrington; John R. G. Lane, Liverpool, both of United Kingdom

[73] Assignee: Bio-Kil Chemicals Limited, London, England

[21] Appl. No.: 932,155

[22] Filed: Nov. 18, 1986

[30] Foreign Application Priority Data

Dec. 13, 1985 [GB] United Kingdom ............... 8530720

[51] Int. Cl.⁴ .......................................... B29C 63/22
[52] U.S. Cl. .................................... 264/269; 264/36; 264/313; 138/97
[58] Field of Search .................... 264/46.9, 269, 313, 264/314, 36, 270; 138/97

[56] References Cited

U.S. PATENT DOCUMENTS

| 2,704,758 | 6/1957 | Harper . | |
|---|---|---|---|
| 4,009,063 | 2/1977 | Wood | 264/269 |
| 4,207,280 | 6/1980 | West et al. | 264/269 |
| 4,210,621 | 7/1980 | Snover et al. | 264/269 |
| 4,252,763 | 2/1981 | Padgett | 264/269 |
| 4,334,943 | 6/1982 | Zenbayashi et al. | 264/269 |
| 4,361,451 | 11/1982 | Renaud | 138/97 |
| 4,602,659 | 7/1986 | Parkyn, Sr. | 264/269 |
| 4,602,974 | 7/1986 | Wood et al. | 264/269 |
| 4,622,196 | 11/1986 | Wood | 264/269 |
| 4,671,840 | 6/1987 | Renaud | 264/269 |
| 4,680,066 | 7/1987 | Wood | 264/270 |

FOREIGN PATENT DOCUMENTS

| 2627860 | 12/1977 | Fed. Rep. of Germany . | |
|---|---|---|---|
| 965132 | 7/1964 | United Kingdom | 264/36 |
| 1449455 | 9/1976 | United Kingdom . | |
| 1501614 | 2/1978 | United Kingdom . | |
| 2082285 | 3/1982 | United Kingdom . | |
| 2094178 | 9/1982 | United Kingdom . | |

Primary Examiner—Jan H. Silbaugh
Assistant Examiner—Allan R. Kuhns
Attorney, Agent, or Firm—Kane, Dalsimer, Sullivan, Kurucz, Levy, Eisele and Richard

[57] ABSTRACT

A method for lining a pipe such as a sewer pipe by applying to the interior of the pipe a layer of a settable composition including a mixture of one or more organic resins with one or more inorganic filling materials, thereafter covering the surface of the said layer with sheet material and thereafter compacting the said layer onto the pipe by exerting pressure thereon through the sheet material, the sheet material being in the form of a tube of polyethylene film or other polymeric film and in that the tube is removed after the pipe lining composition has at least partly set by pulling one end thereof through the interior length of the lined pipe.

6 Claims, 1 Drawing Sheet

METHOD FOR APPLYING A PROTECTIVE COATING

BACKGROUND OF THE INVENTION

1. Field of the Invention

This invention relates to the application of a protective coating to a surface. More particularly, but not exclusively, the invention relates to the applicant of a protective lining to the interior surface of pipes, conduits, tunnels or the like collectively referred to hereafter as pipes, for example water pipes or sewer pipes.

2. Brief Description of the Prior Art

The United Kingdom and other countries have extensive systems of subterranean metal water or sewer pipes which have been laid, in some cases, many year ago. Due to corrosion such systems are becoming more and more prone to leakages and/or blockages due to failure of the pipe walls making an extensive renovation or replacement program desirable. Due to the expense of replacement methods, apparatus and compositions have been developed for applying linings of cement-mortar to the interior of subterranean pipes. By cement-mortar is meant a combination of an inorganic material which sets by reacting with water mixed with it, such as a Portland cement, with an inorganic filling material, such as sand. Depending on their thickness such linings may also provide structural support to the original pipe and provide, in effect, a further pipe within the original pipe. Since many water and sewerage pipes are too small to be entered, or readily entered, by operatives, for example as little as 225 mm, the use of semi- or fully remote-controlled apparatus operable in runs of pipe between existing manholes, which are generally spaced at between about 80 and 150 meters may be necessary or desirable.

In the case of subterranean pipes the application of an internal lining may be by a winched or self-propelled hose-fed pipe-lining machine equipped with means, for example an air motor or otherwise driven centrifugal impeller, to project the coating mixture onto the internal surface of the pipe and a following trailed device such as a trowel, plug or swab device having a surface arranged to be lightly resiliently pressed, in use, towards the surface of the pipe to compact and/or smooth the surface of the lining before it has set. While this system is effective with cement-mortar as such problems may develop when using compositions containing polymeric or resinous additives due to adherence of the composition to smoothing/compacting devices.

West German Patent Publication No. 2627860A relates to a process for lining sections of pipe be by a process in which a mixture of an epoxy resin and an inorganic filler material is introduced into the pipe and is smoothed and compacted by the action of a longitudinally positioned roller having a length corresponding to that of the pipe the roller being in resilient contact with the inner surface of the pipe. In order to prevent the lining composition from sticking to the roller a separating paper sheet is wound around the roller and unwinds as the roller rotates and is allowed to remain on the resinous coating until the latter has cured whereupon the paper is removed. The paper is silicone coated to allow ready release from the cured resin. The procedure of the aforementioned German Patent Publication is not suitable for utilisation on subterranean pipes due to the difficulty of entry thereto of the longitudinal pipe.

SUMMARY OF THE INVENTION

According to one aspect of the invention there is provided a method for lining a pipe comprising applying to the interior of the pipe a layer of a settable composition comprising a mixture of one or more organic resins with one or more inorganic filling materials thereafter covering the surface of the said layer with sheet material and thereafter compacting the said layer onto the pipe by exerting pressure thereon through the sheet material characterised in that the sheet material is in the form of a tube of polyethylene film and in that the said tube is removed after the pipe lining composition has at least partly set by pulling one end thereof through the interior length of the lined pipe.

According to a further aspect of the invention there is provided a method for lining a pipe comprising applying to the interior of the pipe a layer of a settable composition comprising a mixture of one or more organic resins with one or more inorganic filling materials, thereafter covering the surface of the said layer with sheet material and thereafter compacting the said layer onto the pipe by exerting pressure thereon through the sheet material characterised in that the sheet material is in the form of a tube of a film of a polymeric material having a Tear Strength greater than 15 g/mm and in that the said tube is removed after the pipe lining composition has at least partly set by pulling one end thereof through the interior length of the lined pipe.

DETAILED DESCRIPTION OF THE PREFERRED EMBODIMENTS OF THE INVENTION

Figure 1:
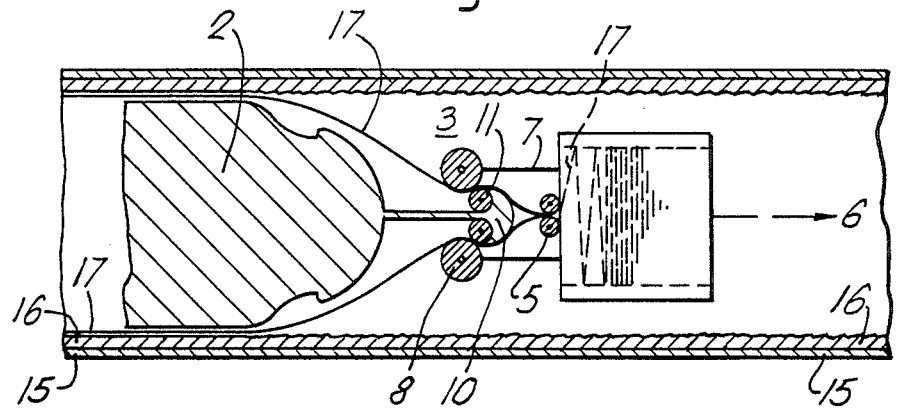
FIG. 1 is a diagrammatic part-sectional view of appartus, to be mounted upon and trailed behind a pipe lining machine (not shown), for storing and dispensing tubular polymeric film.

The word "film" as applied to sheet material is used herein in the normal art sense of a flat section of polymeric material having a thickness not greater than 0.25 mm and having appreciable inherent mechanical properties, such as a tensile strength, % elongation and tear strength which may be measured according to the appropriate Standards for example, respectively American Standard Test Method (ASTM D882, D882, and D922. Herein, Tear Strength, when quoted, is as measured in the last aforesaid American Standard Test Method. The films used according to this invention, since they have to be dispensed in, often, greater than 80 meter lengths within pipes which may have a diameter of as little as 225 mm or less are preferably as thin as possible consistent with sufficient strength to enable stripping from the lining to take place. Preferably the films are below 0.1 mm, particularly preferably below 0.05 mm and for example, most suitably, below, 0.015 mm but preferably at least about 0.001 mm in thickness. In general polymeric film materials provide a far greater resistance to tearing than silicone-treated paper so that long lengths thereof may be stripped from the interior of the pipe while still giving good release characteristics from the set or partially set pipe lining.

Polymeric films for use according to this invention preferably have Tear Strengths of at least 20 g/mm both to enable it to be stripped satisfactorily from the interior of the lined pipe and to enable it to be fed satisfactorily from a suitable dispensing device mounted upon a pipe lining machine. There are constructional difficulties associated with the need to trail a trowel, plug or swab device behind the said lining machine in such a manner as to be enveloped by the polymeric film tube. A preferred manner of achieving the desired effect is to feed the tube between cooperating surfaces, for example low friction surfaces or roller surfaces, one of which is in the interior of the tube, and one of which is outside it, the trailing weight of the trowel plug or swab device being accepted by the impingement of the said surfaces. One manner of construction which achieves this effect is described hereafter.

Some widely available polymeric films are unsuitable for use according to this invention. Examples of such unsuitable films are Cellophane (Trade Mark) and most other cellulosic polymeric films such as cellulose acetate or ethyl cellulose.

While polyethylene film materials are preferred for use according to this invention other films for use according to this invention may be selected from the polyolefins, particularly from vinyl polymers such as polyvinyl alcohol, vinyl chloride/vinyl acetate copolymers or polyvinylidene chloride, from ethylene/vinyl or ethylene/acrylate copolymers or from the acrylates.

Particularly preferably, medium density or low density polyethylene film is used in the practice of this invention. The physical characteristics of these films are as follows:

|  | Low Density | Medium Density |
| --- | --- | --- |
| Normal film Thickness (mm) | 0.0008 | 0.008 |
| Tear Strength ASTM D1922 | 19.7–118 | 19.7–118 |
| Elongation % ASTM.D882 | 100–700 | 50–650 |

The pipe lining compositions envisaged by the present invention may be any polymer-containing cement-mortar. Alternatively the pipe lining composition may be the two-part composition settable on mixing the parts, described and claimed in United Kingdom Patent Specification No. 2146649 of Bio-Kil Chemicals Limited. This composition comprises a polyurethane resin together with a sodium carbonate filler derived from the reaction of an alkaline reactant with carbon dioxide formed in situ by the mixing of a first part comprising a mixture of a di or poly isocyanate and a lactone polyester having an average lactone functionality of at least 2.0 and a second part comprising water and sufficient of a solid alkaline reagent such as, for example, calcium hydroxide. The parts of such a material may suitably be pumped to a pipe lining machine suitable for use in relation to subterranean pipes as described above and including a mixing chamber therefor and applied by such machine to the interior surface of a pipe. Alternatively, if the pipe lining composition is not readily pumpable it may be applied from one or more hoses filled with the composition or with the parts thereof and laid along the length of the pipe to be lined by a pipe lining machine as described and claimed in Patent Application PCT/GB86/00486 in the name of Tate Pipe Lining Processes Limited.

The tubular polymeric film utilised in the practice of the present invention preferably has a circumference not greater than or particularly preferably slightly smaller than, for example up to 10% smaller than, the interior circumference of the pipe lining. Permanent disconformities on the pipe lining resulting, for example, from creases can provide a focus for the growth of undesired organisms, or even the accumulation of deposits, and are undesirable. In this respect a very thin readily stretchable polymeric film such as polyethylene, which has an even greater stretchability or ability for elongation than, for example, polyvinyl chloride enables a relatively smooth lining surface to be obtained. The tubular polymeric film may be applied by dispensing a length of the same from a supply thereof stored in flattened and folded or rolled form in a magazine mounted upon and located rearwardly of a pipe lining machine. The length of film may be opened into its tubular form by passing it over a former and passed over a trailed trowel device or resilient swab or plug device having a normal diameter slightly greater than the internal diameter of the lined pipe so that the film is pressed thereby in fully extended or in stretched condition against the lining material which has as yet not fully set thereby compacting the lining against the interior of the pipe and smoothing the surface of the lining.

When the pipe lining has at least partially set, the tubular film may be stripped by means of a cord or like means attached to on end of the film and fed through the pipe by the movement of the lining machine along it, by pulling the free end of the cord so as to pass one end of the tubular film along the interior of the length of pipe which has been lined.

One arrangement for applying a length of polymeric film in tubing form to the interior of a pipe which is being lined with a polymer-containing cement-mortar is described in detail below with reference to the accompanying drawings.

Figure 2:
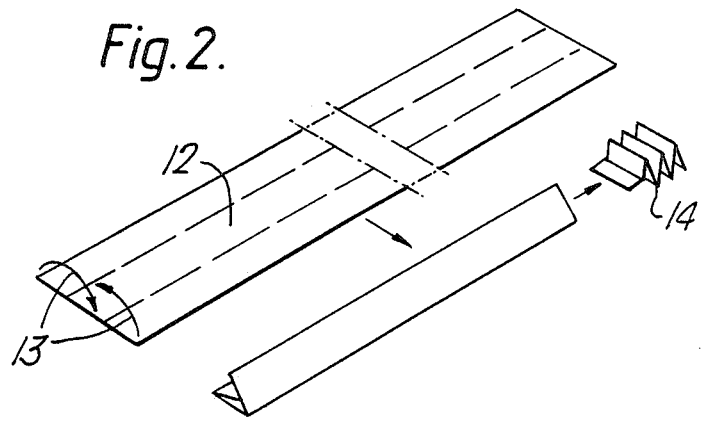
FIG. 2 is a perspective view showing stages in a procedure for folding a polymeric tube for storage on the equipment of FIG. 1.

FIG. 1 is a diagrammatic part-sectional view of apparatus, to be mounted upon and trailed behind a pipe lining machine (not shown), for storing and dispensing tubular polymeric film and FIG. 2 is a perspective view showing stages in a procedure for folding a polymeric tube for storage on the equipment of FIG. 1.

The apparatus depicted in FIG. 1 comprises a polymeric tube storage means 1, a trailed trowel means 2 and an arrangement for coupling the magazine means to the trowel. The magazine means 1 comprises a box having an exit 4 defined by rollers 5 for the egress of the polymeric tube, in flattened form, from the box. The magazine means 1 is mounted upon and trailed in use behind a pipe lining machine (not shown) in the direction shown by the arrow 6. Mounted on the downstream side of the box is a housing 7 supporting two respectively parallel and spaced apart rollers 8, the housing 7 being rearwardly open to provide a mouth between the rollers 8. The trowel means 2 provides a body resiliently pressed against the interior surface of the pipe. It may for example comprise an arrangement of outwardly sprung overlapping vanes or comprise a resilient body, for example, of foamed plastic. Forwardly of the nose 9 of the trowel means there is supported a shaping cone 10 upon which are mounted rollers 11 arranged to cooperate with the rollers 8 to provide nips therebetween by virtue of the trailing resistance of the trowel 2.

The polymeric tubing may be stored within the box 1 by flattening it as depicted at 12 in FIG. 2, edge-folding it as depicted at 13 in the same Figure and forming a concertina-like arrangement of the edge-folded tubing as depicted at 14 of the same Figure.

In use, the apparatus depicted in FIGS. 1 and 2 may be trailed behind a pipe lining machine moving along the axis of the pipe interior in the direction shown by the arrow 6 simultaneously depositing a coating 16 on the interior wall of the pipe 15. The polymeric tube 17, which has been packed within the box 1 in flattened and folded form, is fed through the slit defined by the rollers 5, over the cone 10 through the nips provided by the sets of rollers 8 and 11 and over the outside of the trowel 2. As the apparatus is trailed along the pipe the polymeric tubing is withdrawn from the box 1 and is applied under the resilient pressure exerted by the trowel means 2 onto the interior surface of the still soft pipe coating thereby smoothing it without direct contact between the said coating and the trowel.

When a requisite length of pipe has been coated and trowelled the polymeric tubing may be removed, if desired, by means of a cord or the like which is initially placed within the polymeric tubing and which is attached to at least one end thereof so that, when the coating apparataus has traversed the length of a pipe the cord lies along the length of the pipe. By pulling one end of the cord the polymeric tubing may be inverted and peeled off along the length of the pipe.

What is claimed is:

1. A method for lining a pipe, which comprises moving a pipe lining machine along the interior of a pipe, said machine being connected to a source of a settable polymer-containing cement mortar;

applying with said pipe lining machine a layer of the cement mortar to the interior surface of the pipe;

providing rearwardly of the pipe lining machine and trailed thereby a storage means for a length of tubular polymeric film, the film having a Tear Strength of at least 15 g/mm, and the circumference of the tube being less than the interior circumference of the pipe lining;

providing rearwardly of the storage means a trailed smoothing and compacting device having a resiliently outwardly pressed surface;

dispensing the tubular polymeric film from the storage means and passing the film over the smoothing and compacting device in the stretched state so as to envelop the smoothing and compacting device and cover the layer of cement mortar with the film, and so as to smooth and compact the layer of cement mortar with said device;

allowing the smoothed and compacted cement mortar to at least partially set; and removing the polymeric film therefrom by pulling one end of the film through the interior length of the lined pipe.

2. A method as claimed in claim 1 wherein the film has a thickness of from 0.001 to 0.1 mm.

3. A method as claimed in claim 2 wherein the film is of a polyolefinic material.

4. A method as claimed in claim 3 wherein the film is of a vinyl polymer or copolymer, polyethylene, polypropylene or a polyacrylate.

5. A method as claimed in claim 1 wherein the film is of medium density or low density polyethylene.

6. A method as claimed in claim 5 wherein the film has a Tear Strength of at least 20 g/mm.

* * * * *

UNITED STATES PATENT AND TRADEMARK OFFICE
CERTIFICATE OF CORRECTION

PATENT NO. : 4,810,453
DATED : March 7, 1989
INVENTOR(S) : Neil Clarke and John R.G. Lane It is certified that error appears in the above—identified patent and that said Letters Patent is hereby corrected as shown below:

Col. 1, line 9; the word "applicant" should read
-- application -- .

Col. 1, line 54; after the word "pipe" delete the word "be"
and insert the words -- before installation -- .

Col. 2, line 52; insert parenthesis after "ASTM" and "D922"
should read -- D1922 -- .

Col. 4, line 31; "on" should read -- one -- .

Signed and Sealed this

Fifth Day of December, 1989

Attest:

JEFFREY M. SAMUELS

*Attesting Officer*  *Acting Commissioner of Patents and Trademarks*